(12) United States Patent
Kim (10) Patent No.: US 9,278,682 B2
(45) Date of Patent: Mar. 8, 2016

(54) SYSTEM AND METHOD FOR CONTROLLING AUTO CRUISE OF HYBRID ELECTRIC VEHICLE

(71) Applicant: Hyundai Motor Company, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/099,141

(22) Filed: Dec. 6, 2013

(65) Prior Publication Data

US 2014/0244083 A1    Aug. 28, 2014

(30) Foreign Application Priority Data

Feb. 28, 2013    (KR) ........................ 10-2013-0022418

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2006.01) |
| B60W 10/06 | (2006.01) |
| B60W 10/08 | (2006.01) |
| B60K 6/48 | (2007.10) |
| B60K 31/00 | (2006.01) |
| B60W 30/14 | (2006.01) |

(52) U.S. Cl.
CPC .................. *B60W 20/00* (2013.01); *B60K 6/48* (2013.01); *B60K 31/00* (2013.01); *B60W 10/06* (2013.01); *B60W 10/08* (2013.01); *B60W 20/108* (2013.01); *B60W 30/143* (2013.01); *B60W 2550/142* (2013.01); *Y02T 10/6221* (2013.01); *Y02T 10/6286* (2013.01); *Y02T 10/7258* (2013.01); *Y10S 903/93* (2013.01)

(58) Field of Classification Search
CPC ...... B60W 20/00; B60W 10/08; B60W 10/06
USPC ............................................................. 701/22
See application file for complete search history.

(56) References Cited

U.S. PATENT DOCUMENTS

2010/0268432 A1* 10/2010 Arai et al. .................. 701/96
2014/0148986 A1* 5/2014 Yoshikawa et al. ......... 701/22

* cited by examiner

*Primary Examiner* — Maceeh Anwari
(74) *Attorney, Agent, or Firm* — Mintz Levin Cohn Ferris Glovsky and Popeo, P.C.; Peter F. Corless (57) ABSTRACT

A system and method for controlling automatic cruise control system is provided. More specifically, a request torque for the automatic cruise control system is calculated based on the target vehicle speed and the inclination angle of a road on which the vehicle travels, and the calculated request torque is distributed into engine torque and motor torque at a predetermined ratio. The engine and a motor are then controlled so that the engine and the motor generate torque at the predetermined ratio, and a speed difference between the traveling vehicle speed and the target vehicle speed are calculated. Additionally, a following motor torque is calculated for following the target vehicle speed based on the calculated speed difference and then is added to the distributed motor torque. The traveling vehicle speed is then controlled to the target vehicle speed based on the summed motor torque.

10 Claims, 6 Drawing Sheets

SYSTEM AND METHOD FOR CONTROLLING AUTO CRUISE OF HYBRID ELECTRIC VEHICLE

CROSS-REFERENCE TO RELATED APPLICATION

This application claims priority to and the benefit of Korean Patent Application No. 10-2013-0022418 filed in the Korean Intellectual Property Office on Feb. 28, 2013, the entire contents of which are incorporated herein by reference.

BACKGROUND (a) Field of the Invention

The present invention relates to a system and a method for controlling an automatic cruise control of a hybrid vehicle.

(b) Description of the Related Art

Hybrid vehicles (hybrid electric vehicles) use at least two power sources (e.g., an internal combustion engine and battery power). In an electric hybrid vehicle, power from the engine and an electric motor are used to provide power to the drivetrain.

Figure 1:
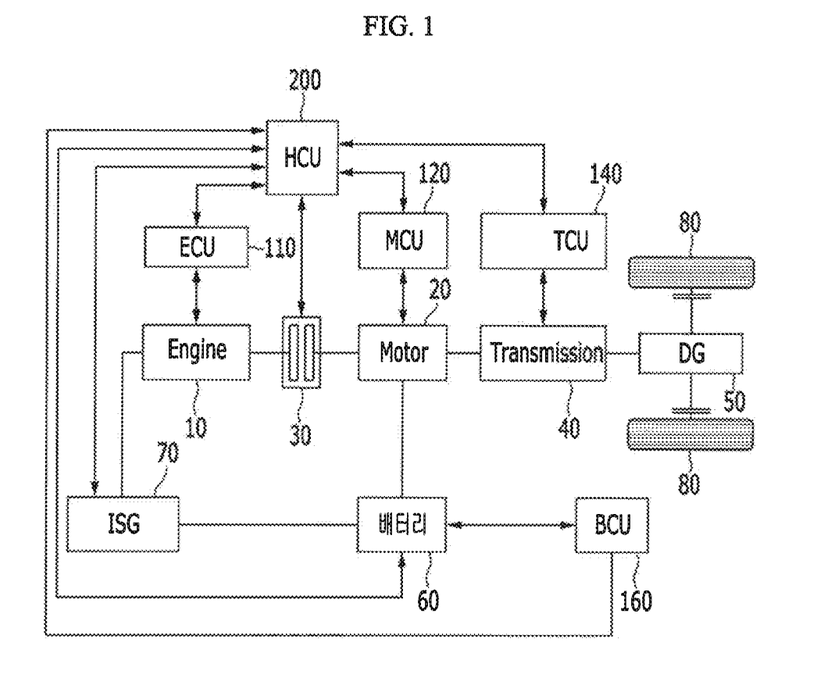
FIG. 1 is a block diagram conceptually showing a common hybrid vehicle.

The hybrid vehicles may include, for example, as shown in FIG. 1, an engine 10, a motor 20, an engine clutch 30 connecting/disconnecting power between the engine 10 and the motor 20, a transmission 40, a differential gear system 50, a battery 60, an integrated starter-generator 70 starting the engine 10 or generating electricity by the output from the engine 10, and wheels 80.

Further, the hybrid vehicles may include an HCU (Hybrid Control Unit) 200 that controls the entire operation of the hybrid vehicle, an ECU (Engine Control Unit) 110 that controls the operation of the engine 10, an MCU (Motor Control Unit) 120 that controls the operation of the motor 20, a TCU (Transmission Control Unit) 140 that controls the operation of the transmission 40, and a BCU (Battery Control Unit) 160 that controls and managing the battery 60.

The BCU 160 is sometimes referred to as a BMS (Battery Management System). The integrated starter-generator 70 is sometimes referred to as an ISG (integrated starter & generator) or an HSG (hybrid starter & generator).

The hybrid vehicles are often operated in a plurality of different modes such as an EV mode (Electric Vehicle mode) that is an electric vehicle mode using only the power from the motor 20, an HEV mode (Hybrid Electric Vehicle mode) using the torque from the engine 10 as the main power source and the torque from the motor 20 as a sub-power source, and an RB mode (Regenerative Braking mode) which collects braking and inertia energy by means of electricity generation from the motor 20. The RB mode charges the battery 60, when the vehicles are braked or driven by the inertia. The hybrid vehicles (like other conventional vehicles) may be equipped with an automatic cruise control system that maintains the traveling vehicle speed of the vehicle at a predetermined target vehicle speed (target vehicle speed) without as the driving having to operate the accelerator pedal or the brake pedal.

Figure 2:
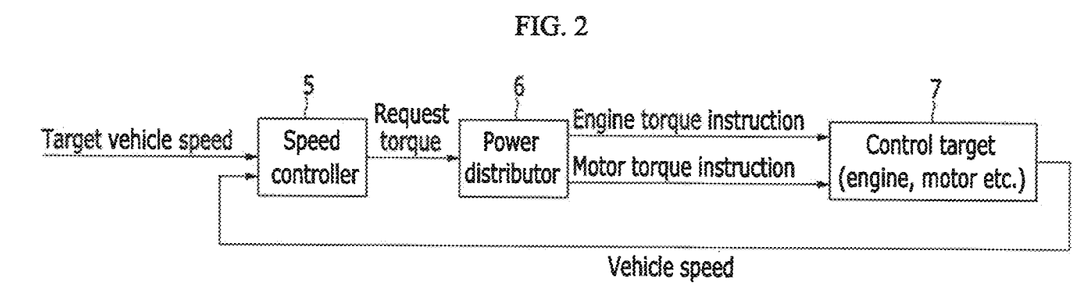
FIG. 2 is a block diagram conceptually showing a system for controlling automatic cruise of a hybrid vehicle according to an exemplary embodiment of the related art.

FIG. 2 shows a schematic configuration of an automatic cruise control system of a hybrid vehicle according to an exemplary embodiment of the related art. The automatic cruise control system of a hybrid vehicle according to an exemplary embodiment of the related art, in automatic cruise control, calculates driver request toque by means of a speed control unit 5 and performs automatic cruise control by producing an engine torque instruction and a motor torque instruction from the calculated driver request torque and provides instructions to the engine and the motor included in a control target 7. The automatic cruise control system of a hybrid vehicle according to an exemplary embodiment of the related art can rapidly change the engine torque instruction to provide an accurate target vehicle speed, when the request torque rapidly changes.

Accordingly, the automatic cruise control system of a hybrid vehicle according to an exemplary embodiment of the related art opens the engine throttle at a predetermined level and changes the spark timing to cope with the rapidly changed engine torque instruction, which may deteriorate the fuel efficiency. Thus, there is a need for a more fuel efficient automatic cruise control system.

The Description of the Related Art is made to help understanding the background of the present invention and may include matters out of the related art known to those skilled in the art.

The above information disclosed in this Background section is only for is enhancement of understanding of the background of the invention and therefore it may contain information that does not form the prior art that is already known in this country to a person of ordinary skill in the art.

SUMMARY

The present invention has been made in an effort to provide a system and a method for controlling automatic cruise of a hybrid vehicle having advantages of performing automatic cruise of a hybrid vehicle by calculating traveling load from a target vehicle speed and an inclination angle and using it as request torque, and by distributing power from an engine and a motor, and by generating the final motor torque by adding following torque by a speed controller to the distributed motor torque.

An exemplary embodiment of the present invention provides a method of controlling automatic cruise of a hybrid vehicle that is a method of controlling automatic cruise which automatically controls a traveling vehicle speed of a hybrid vehicle to a predetermined target vehicle speed, and the method may include: calculating request torque for automatic cruise based on the target vehicle speed and the inclination angle of a road on which the vehicle is travelling. The calculated request torque is then distributed into engine torque and motor torque at a predetermined ratio and then an instruction is provided to an engine and a motor so that the engine and the motor generate torque at the predetermined ratio. Next, the s speed difference is calculated between the traveling vehicle speed and the target vehicle speed and the following motor torque is calculated for following the target vehicle speed based on the calculated speed difference and then the following motor torque is added to the distributed motor torque. The traveling vehicle speed controlled to the target vehicle speed by providing an instruction which includes the summed motor torque to the motor.

When the target vehicle speed changes, the request torque may be updated and calculated based on the changed target vehicle speed and the updated and calculated request torque may be distributed into updated engine torque and motor torque at a predetermined ratio. When the inclination angle of the road or traveling load of the hybrid vehicle changes, instructions of the engine torque and the motor torque distributed at the predetermined ratio may be maintained.

In some embodiments of the present invention, the calculating of following motor torque for following the target vehicle speed based on the calculated speed difference and adding of the following motor torque to the distributed motor torque may be performed by PID (Proportional Integral Differential) control.

Additionally, when the calculated request torque is applied the engine torque and the motor torque at a predetermined ratio, balancing of the SOC (State Of Charge) of the battery 60 (FIG. 1) of a hybrid vehicle may be considered.

Another exemplary embodiment of the present invention provides a system for controlling automatic cruise of a hybrid vehicle which automatically controls a traveling vehicle speed of a hybrid vehicle to a predetermined target vehicle speed. More specifically, a inclination angle sensor detects the inclination angle of a road on which the hybrid vehicle is traveling and a vehicle speed sensor detects a traveling vehicle speed of the hybrid vehicle. A control target that includes an engine, a motor, a transmission, and a brake system, for controlling the traveling vehicle speed of the hybrid vehicle; and a controller that controls the traveling vehicle speed to a predetermined target vehicle speed by controlling the control target in response to signals inputted from the inclination angle sensor and the vehicle speed sensor, in which the controller may be operated by program instructions configured to perform the method of controlling automatic cruise of a hybrid vehicle according to an exemplary embodiment of the present invention.

The controller may include: a traveling load calculator that calculates traveling load based on the target vehicle speed and the inclination angle of the road detected by the inclination angle sensor and calculates request torque for automatic cruise based on the calculated traveling load; a power distributor that distributes engine torque and motor torque at a predetermined ratio based on the calculated request torque and provides program instructions which control the engine and the motor accordingly; a speed controller that calculates a speed difference between the target vehicle speed and the traveling vehicle speed detected by the vehicle speed sensor and calculates following motor torque for following the target vehicle speed based on the speed difference; and an adder that adds the following motor torque calculated by the speed controller to the motor torque distributed by the power distributor.

As described above, according to an exemplary embodiment of the present invention, it is possible to improve fuel efficiency and the performance of controlling a speed of the vehicle by calculating traveling load from a target vehicle speed and an inclination angle and using the calculation as request torque, and by distributing power for an engine and a motor, and by controlling automatic cruise of a hybrid vehicle by generating the final motor torque by adding following torque by a speed controller to the distributed motor torque.

DETAILED DESCRIPTION OF THE EMBODIMENTS

Hereinafter, the present invention will be described more fully hereinafter with reference to the accompanying drawings, in which exemplary embodiments of the invention are shown. However, the present invention is not limited to the exemplary embodiments described herein and may be embodied in other ways.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below processes, programs, methods, etc. are executed by at least one controller or in some embodiments a plurality of controllers working in communication. The term controller refers to a hardware device that includes a memory and a processor that is specifically programed to perform the described processes and methods. The memory is configured to store the instructions/modules and the processor is specifically configured to execute said instructions/modules to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, by a telematics server or a Controller Area Network (CAN).

Furthermore, like reference numerals are given to like components throughout the specification.

Through the present specification, unless explicitly described otherwise, "including" any components will be understood to imply the inclusion of other components rather than the exclusion of any other components.

FIG. 1 is a diagram schematically showing a hybrid vehicle to be equipped with a system for controlling automatic cruise according to an exemplary embodiment of the present invention. As shown in FIG. 1, the hybrid vehicle to be equipped with a system for controlling automatic cruise according to an exemplary embodiment of the present invention may include an engine 10, a motor 20, an engine clutch 30 connecting/disconnecting power between the engine 10 and the motor 20, a transmission 40, a differential gear system 50, a battery 60, an integrated starter-generator 70 starting the engine 10 or generating electricity by the output from the engine 10, and wheels 80.

Further, the hybrid vehicle to be equipped with a system for controlling automatic cruise according to an exemplary embodiment of the present invention may include an HCU (Hybrid Control Unit) 200 controlling the entire operation of the hybrid vehicle, an ECU (Engine. Control Unit) 110 controlling the operation of the engine 10, an MCU (Motor Control Unit) 120 controlling the operation of the motor 20, a TCU (Transmission Control Unit) 140 controlling the operation of the transmission 40, and a BCU (Battery Control Unit) 160 controlling and managing the battery 60.

Figure 3:
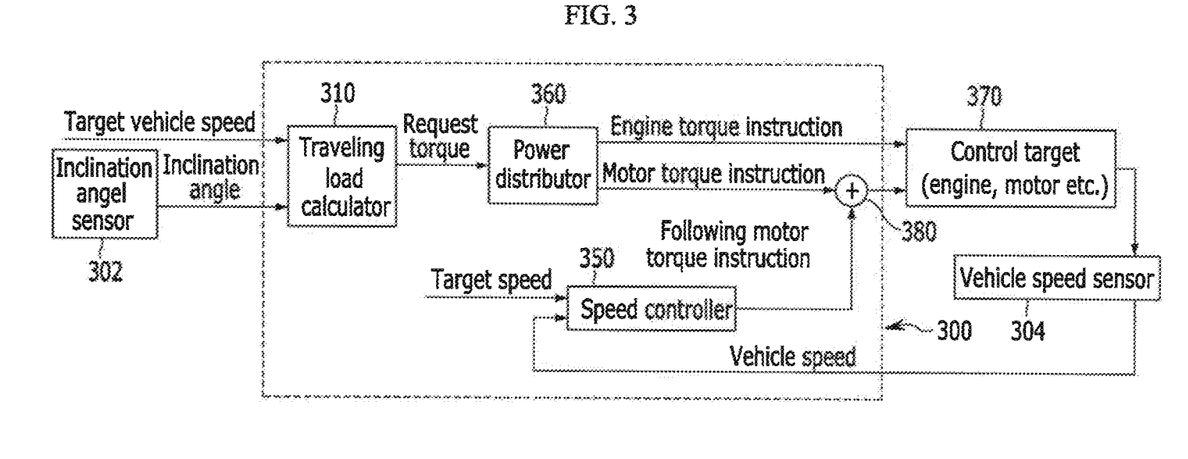
FIG. 3 is a block diagram showing a system for controlling automatic cruise of a hybrid vehicle according to an exemplary embodiment of the present invention.

FIG. 3 is a block diagram showing a system for controlling automatic cruise of a hybrid vehicle according to an exemplary embodiment of the present invention. The system for controlling automatic cruise of a hybrid vehicle according to an exemplary embodiment of the present invention is a system that performs automatic cruise of a hybrid vehicle by calculating traveling load from a target vehicle speed and an inclination angle and uses the calculation as request torque, and by distributing power for an engine and a motor, and by generating the final motor torque by adding following torque by a speed controller to the distributed motor torque.

The system for controlling automatic cruise according to an exemplary embodiment of the present invention may include: an inclination angle sensor 302 that detects the inclination angle of the road on which the hybrid vehicle travels; a vehicle speed sensor 304 that detects the vehicle speed of the hybrid vehicle; a control target 370 that includes the engine 10, the motor, the transmission, and the brake system shown in FIG. 1 to control the traveling vehicle speed of the hybrid vehicle; and a controller 300 that controls the traveling vehicle speed at a predetermined target vehicle speed by controlling particularly the engine and the motor in the control target 370 in response to signals inputted from the inclination angle sensor 302 and the vehicle speed sensor 304.

The inclination angle sensor 302 may be a final acceleration sensor that is mounted on a wheel and detects the final inclination of a vehicle, as an example in an exemplary embodiment of the present invention, or may be a final acceleration sensor associated with an ABS (Anti-lock Braking System) as another example, but it should be understood that the present invention is not limited thereto. Even if other configurations are different, the spirit of the present invention can be applied to them, as long as they enable calculation of a value corresponding to the inclination angle of a vehicle.

The vehicle speed sensor 304 may be a vehicle speed sensor that is attached to a wheel and detects a rotation speed, as an example in an exemplary embodiment of the present invention, or may be a vehicle speed sensor that is attached to a final reduction gear in a transmission, as another example, but it should be understood that the present invention is not limited thereto. Even if other configurations are different, the spirit of the present invention can be applied to them, as long as they enable calculation of a value corresponding to a vehicle speed.

The controller 300, as stated above, includes one or more microprocessors operated by a predetermined program for performing a method of controlling automatic cruise according to an exemplary embodiment of the present invention, which is described below.

The controller 300, as shown in FIG. 3, may include: a traveling load calculator 310 that calculates traveling load based on the target vehicle speed and the inclination angle of the road detected by the inclination angle sensor 302 and calculates request torque for automatic cruise based on the calculated traveling load. A power distributor 360 distributes engine torque and motor torque at a predetermined ratio based on the calculated request torque and gives an instruction to the engine 10 and the motor 20. A speed controller 350 calculates a speed difference between the target vehicle speed and the traveling vehicle speed detected by the vehicle speed sensor 304 and calculates following motor torque for following the target vehicle speed based on the speed difference. An adder 380 adds the following motor torque calculated by the speed controller 350 to the motor torque distributed by the power distributor 360.

The components in the controller 300 may be implemented by one or more microprocessors operated by a predetermined program.

Figure 6:
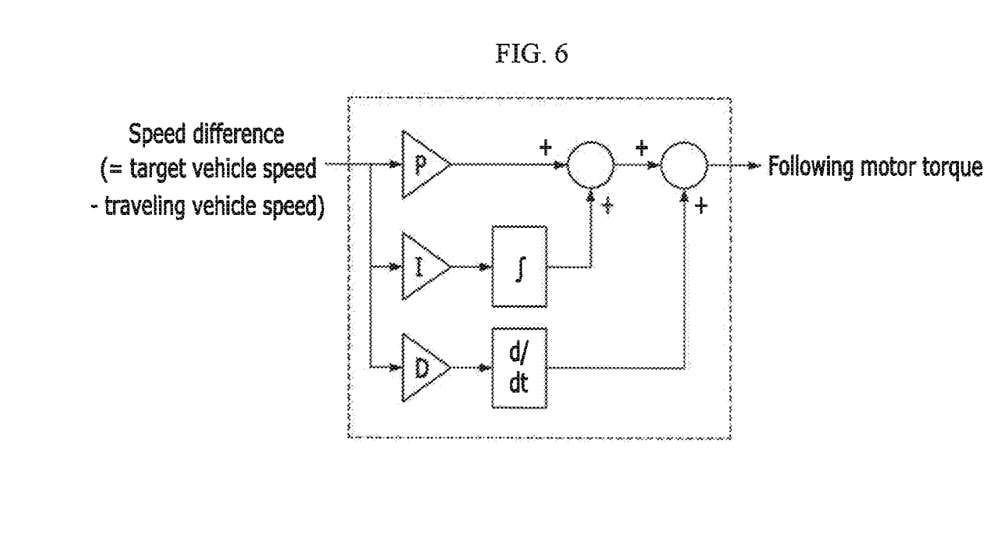
FIG. 6 is a diagram illustrating the operation of the method of controlling automatic cruise of a hybrid vehicle according to an exemplary embodiment of the present invention.

Furthermore, the speed controller 350 may perform feedback control on the vehicle speed to make the traveling vehicle speed, which is detected by the vehicle speed sensor 304, follow the target vehicle speed, as an example in an exemplary embodiment of the present invention, and for this configuration, it may include a PID (Proportional Integral Differential) controller, as shown in FIG. 6. The configuration and operation of the PID controller, however, are generally known to those skilled in the art and the detailed description is not provided.

In an exemplary embodiment of the present invention, the controller 300 may include an ECU (Engine Control Unit) that controls the engine 10 of a hybrid vehicle shown in FIG. 1, an MCU (Motor Control Unit) that controls the motor 20, a TCU (Transmission Control Unit) that controls the transmission 40, and an HCU (Hybrid Control Unit) that controls the entire operation of a hybrid vehicle.

In the method of controlling automatic cruise according to an exemplary embodiment of the present invention which is described below, some processes may be performed by the ECU, other processes may be performed by the MCU, and other processes may be performed by the TCU, and the other processes may be performed by the HCU. However, the scope of the present invention should not be construed as being limited to the description about the following exemplary embodiments. The controller may be implemented by other combination different from the description about exemplary embodiments of the present invention. Alternatively, the ECU, MCU, TCU, and MU may perform other combination of processes different from those described in the exemplary embodiments.

Hereinafter, a method of controlling a traveling mode of a hybrid vehicle according to an exemplary embodiment of the present invention is described in detail with reference to the accompanying drawings.

Figure 4:
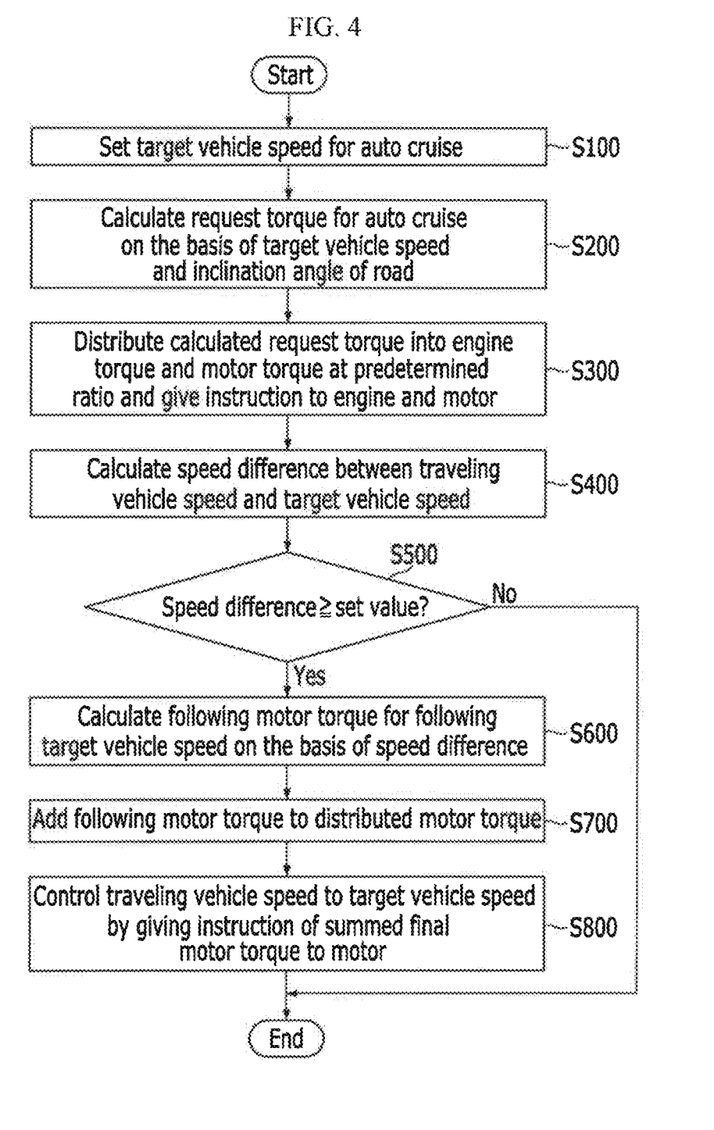
FIG. 4 is a flowchart illustrating a method of controlling automatic cruise of a hybrid vehicle according to an exemplary embodiment of the present invention.

FIG. 4 is a flowchart illustrating a method of controlling a traveling mode of a hybrid vehicle according to an exemplary embodiment of the present invention. As shown in FIG. 4, the controller 300 calculates request torque for automatic cruise based on the target vehicle speed set by a user (driver) and a signal from the inclination angle sensor 302 detecting the inclination angle of the road (S100 and S200). The request torque may be calculated by the traveling load calculator 310 of the controller 300.

Figure 5:
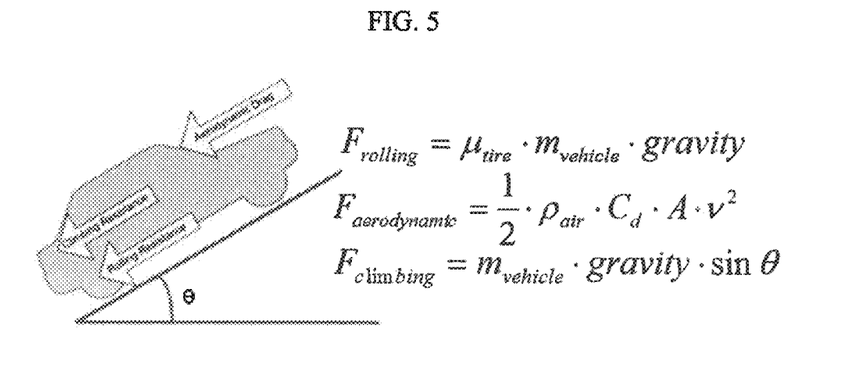
FIG. 5 is a block diagram showing the internal configuration of a speed controller in a system for controlling automatic cruise of a hybrid vehicle according to an exemplary embodiment of the present invention.

The traveling load calculator 310, as an example in an exemplary embodiment of the present invention, as shown in FIG. 5, may calculate a force F as traveling load exerted in a hybrid vehicle based on the target vehicle speed v set by the driver and the inclination angle θ of the road detected by the inclination angle sensor 302, and may calculate the request torque by multiplying the calculated force F by the radius of the wheel.

In FIG. 5, the force F may be defined as the sum of a rolling resistant force $F_{rolling}$ due to rolling of the wheels, an air resistant force $F_{aerodynamic}$ due to air resistance against the vehicle body in traveling, and an inclination resistant force $F_{climbing}$ due to the inclination angle of the road. The rolling resistant force $F_{rolling}$, the air resistant force $F_{aerodynamic}$, and the inclination resistant force $F_{climbing}$ can be calculated by the following equations. In the following equations, A is the front area (m²) of a vehicle, $C_d$ is a negative coefficient, and $\rho$ is the air density (kg/m3) in the atmosphere.

$$F_{rolling} = \mu_{tire} \cdot m_{vehicle} \cdot \text{gravity} \quad \text{Equation 1}$$

$$F_{rolling} = \mu_{tire} \cdot m_{vehicle} \cdot \text{gravity} \quad \text{Equation 2}$$

$$F_{aerodynamic} = \frac{1}{2} \cdot \rho_{air} \cdot C_d \cdot A \cdot v^2 \quad \text{Equation 3}$$

$$F_{aerodynamic} = \frac{1}{2} \cdot \rho_{air} \cdot C_d \cdot A \cdot v^2 \quad \text{Equation 4}$$

$$F_{climbing} = m_{vehicle} \cdot \text{gravity} \cdot \sin\theta \quad \text{Equation 5}$$

$$F_{climbing} = m_{vehicle} \cdot \text{gravity} \cdot \sin\theta \quad \text{Equation 6}$$

When the inclination angle sensor is a final acceleration sensor, the inclination angle θ can be obtained as follows. Also in the following equations, long_accel_val is an output signal value from the final acceleration sensor, M is the weight of a vehicle, a is traveling acceleration of a vehicle, and g is the gravitational acceleration.

$$Ma = F - (F_{aerodynamic} + F_{Rolling} + F_{Climbing}) \quad \text{Equation 7}$$
$$Ma = F - (F_{aerodynamic} + F_{Rolling} + Mg\ \sin\theta)$$
$$F - (F_{aerodynamic} + F_{Rolling}) = M \cdot (a + g\ \sin\theta)$$
$$\text{long\_accel\_val} = a + g\ \sin\theta$$
$$g\ \sin\theta = \text{long\_accel\_val} - a$$
$$\sin\theta \cong \theta = \frac{1}{g}(\text{long\_accel\_val} - a)$$
$$\therefore \theta = \frac{1}{g}(\text{long\_accel\_val} - a)$$

When the traveling load calculator 310 calculates the request torque for the automatic cruise based on the target vehicle speed and the inclination angle of the road in S200, the controller 300 distributes the calculated request torque into engine torque and motor torque at a predetermined ratio by means of the power distributor and gives an instruction to the engine and the motor so that the engine 10 and the motor generate torque at the predetermined ratio (S300). However, it would be apparent to those skilled in the art that the predetermined ratio can be set as an optimal value through test data.

Furthermore, the power distributor 360 may appropriately distribute the calculated request torque into the engine torque and the motor torque at a predetermined ratio in consideration of balancing of the SOC (State Of Charge) of the battery 60 (FIG. 1) of a hybrid vehicle. When the engine torque instruction and the motor torque instruction are provided to the engine and the motor, respectively, by the power distributor 360, the engine and the motor generate the provided torque and the hybrid vehicle travels, using the torque generated by the engine and the motor. When the hybrid vehicle travels, the vehicle speed sensor 304 detects the traveling vehicle speed and inputs it to the speed controller 350.

When the vehicle speed detected by the vehicle speed sensor 304 is inputted, the speed controller 350 of the controller 300 is configured to calculate the speed difference between the target vehicle speed and the detected traveling vehicle speed and determine whether the calculated speed difference is a predetermined value or more (S400 and S500). This predetermined value may be 2~5% of the target vehicle speed, as an example in an exemplary embodiment of the present invention, but it should be understood that the present invention is not limited thereto.

When the speed difference is the predetermined value or more, the speed controller 350 calculates following motor torque for following the target vehicle speed based on the speed difference and inputs it to the adder 380 (S600). Once the following motor torque is inputted to the adder 380, the adder 380 adds the input following motor torque to the motor torque distributed by the power distributor 360 and gives an instruction of the final motor torque so that the traveling vehicle speed follows the target vehicle speed (S700 and S800).

Then, when the target vehicle speed changes during the automatic cruise control of the controller 300, the controller 300 may update and calculate the request target based on the changed target vehicle speed, as described above, and then may distribute the updated and calculated request torque into updated engine torque and motor torque at a predetermined ratio.

When the traveling vehicle speed, not the target vehicle speed, is changed due to a change in inclination angle of the road or traveling load of the hybrid vehicle, the controller 300 may calculate following motor torque according to the changed traveling vehicle speed by means of the speed controller 350, with the engine torque instruction and the motor torque instruction, which are distributed at a predetermined ratio, maintained, and may add it to the distributed motor torque so that the traveling vehicle speed follows the target vehicle speed.

Therefore, according to an exemplary embodiment of the present invention, when there is no change in traveling load, for example, when there is no change in inclination angle of the road, the engine torque instruction does not largely change, such that predetermined throttle and ignition angle control can be utilized, and accordingly, the engine efficiency can be improved as much as the control.

Further, according to an exemplary embodiment of the present invention, since the final motor torque is generated by adding the following motor torque generated by the speed controller to the motor torque distributed by the power distributor and an instruction of the final motor torque is provided to the motor having rapid response, the performance of controlling automatic cruise can be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 300: Controller | 302: Inclination angle sensor |
| 304: Vehicle speed sensor | 310: Traveling load calculator |
| 350: Speed controller | 360: Power distributor |

What is claimed is:

1. A method of controlling automatic cruise system which automatically controls a traveling vehicle speed of a hybrid vehicle to a predetermined target vehicle speed, the method comprising:
   calculating, by a controller, request torque for the automatic cruise control system based on the target vehicle speed and the inclination angle of a road on which the vehicle is traveling;
   distributing, by a controller, the calculated request torque into engine torque and motor torque at a predetermined ratio and then controlling engine and a motor so that the engine and the motor generate torque at the predetermined ratio;
   calculating, by a controller, a speed difference between the traveling vehicle speed and the target vehicle speed;
   calculating, by a controller, a following motor torque that follows the target vehicle speed based on the calculated speed difference and then adding the following motor torque to the distributed motor torque; and
   controlling, by a controller, the traveling vehicle speed to the target vehicle speed by controlling the motor based on the summed motor torque.

2. The method of claim 1, wherein when the target vehicle speed changes, the request torque is updated and calculated based on the changed target vehicle speed and the updated and calculated request torque is distributed into updated engine torque and motor torque at a predetermined ratio.

3. The method of claim 1, wherein when the inclination angle of the road or traveling load of the hybrid vehicle changes, instructions regarding the engine torque and the motor torque distributed at the predetermined ratio are maintained.

4. A system for controlling automatic cruise which automatically controlling a traveling vehicle speed of a hybrid vehicle to a predetermined target vehicle speed, the system comprising:
   a inclination angle sensor that detects the inclination angle of a road on which the hybrid vehicle travels;
   a vehicle speed sensor that detects a traveling vehicle speed of the hybrid vehicle;
   a control target that includes an engine, a motor, a transmission, and a brake system, for controlling the traveling vehicle speed of the hybrid vehicle; and
   a controller that controls the traveling vehicle speed to a predetermined target vehicle speed by controlling the control target in response to signals inputted from the inclination angle sensor and the vehicle speed sensor,
   wherein the controller
   is operated by program instructions that when executed by a processor in the controller calculate a request torque for automatic cruise based on the target vehicle speed and the inclination angle of a road on which the vehicle is traveling; distribute the calculated request torque into engine torque and motor torque at a predetermined ratio and then control the engine and the motor so that the engine and the motor generate torque at the predetermined ratio; calculate a speed difference between the traveling vehicle speed and the target vehicle speed; calculate a following motor torque that follows the target vehicle speed based on the calculated speed difference and then add the following motor torque to the distributed motor torque; and control the traveling vehicle speed to the target vehicle speed by controlling a motor with the summed motor torque.

5. The system of claim 4, wherein the controller includes:
   a traveling load calculator that calculates traveling load based on the target vehicle speed and the inclination angle of the road detected by the inclination angle sensor and calculates request torque for automatic cruise based on the calculated traveling load;
   a power distributor that distributes engine torque and motor torque at a predetermined ratio based on the calculated request torque and gives an instruction to the engine and the motor;
   a speed controller that calculates a speed difference between the target vehicle speed and the traveling vehicle speed detected by the vehicle speed sensor and calculates following motor torque for following the target vehicle speed based on the speed difference; and
   an adder that adds the following motor torque calculated by the speed controller to the motor torque distributed by the power distributor.

6. The system of claim 4, wherein when the target vehicle speed changes, the request torque is updated and calculated based on the changed target vehicle speed and the updated and calculated request torque is distributed into updated engine torque and motor torque at a predetermined ratio.

7. The system of claim 4, wherein when the inclination angle of the road or traveling load of the hybrid vehicle changes, the engine torque and the motor torque distributed at the predetermined ratio are maintained.

8. A non-transitory computer readable medium containing program instructions executed by a processor on a controller, the computer readable medium comprising:
   program instructions that calculate request torque for automatic cruise based on the target vehicle speed and the inclination angle of a road on which the vehicle travels;
   programs instructions that distribute the calculated request torque into engine torque and motor torque at a predetermined ratio and then control an engine and a motor so that the engine and the motor generate torque at the predetermined ratio;
   program instructions that calculate a speed difference between the traveling vehicle speed and the target vehicle speed;
   program instructions that calculate following motor torque that follows the target vehicle speed based on the calculated speed difference and then adding the following motor torque to the distributed motor torque; and
   program instructions that control the traveling vehicle speed to the target vehicle speed by controllling the motor with the summed motor torque.

9. The non-transitory computer readable medium of claim 8, wherein when the target vehicle speed changes, the request torque is updated and calculated based on the changed target vehicle speed and the updated and calculated request torque is distributed into updated engine torque and motor torque at a predetermined ratio.

10. The non-transitory computer readable medium of claim 8, wherein when the inclination angle of the road or traveling load of the hybrid vehicle changes, the engine torque and the motor torque distributed at the predetermined ratio are maintained.

* * * * *